US012803126B2

(12) United States Patent
Li

(10) Patent No.: US 12,803,126 B2
(45) Date of Patent: Nov. 17, 2026

(54) BATTERY CONNECTION MODULE

(71) Applicant: Molex, LLC, Lisle, IL (US)

(72) Inventor: Yun-Jin Li, Chengdu (CN)

(73) Assignee: Molex, LLC, Lisle, IL (US)

( * ) Notice: Subject to any disclaimer, the term of this patent is extended or adjusted under 35 U.S.C. 154(b) by 200 days.

(21) Appl. No.: 18/244,331

(22) Filed: Sep. 11, 2023

(65) Prior Publication Data

US 2024/0088526 A1 Mar. 14, 2024

(30) Foreign Application Priority Data

Sep. 14, 2022 (CN) ......................... 202222437176.6

(51) Int. Cl.

| | |
|---|---|
| ***H01M 50/519*** | (2021.01) |
| ***H01M 50/516*** | (2021.01) |
| ***H01M 50/569*** | (2021.01) |
| ***H01R 4/02*** | (2006.01) |
| ***H01R 12/51*** | (2011.01) |

(52) U.S. Cl.
CPC ....... *H01M 50/519* (2021.01); *H01M 50/516* (2021.01); *H01M 50/569* (2021.01); *H01R 4/029* (2013.01); *H01R 12/51* (2013.01)

(58) Field of Classification Search
CPC ............. H01M 50/519; H01M 50/516; H01M 50/569; H01R 4/029; H01R 12/51
See application file for complete search history.

(56) References Cited

U.S. PATENT DOCUMENTS

| | | | | |
|---|---|---|---|---|
| 11,140,780 | B2 * | 10/2021 | Ganor | H05K 1/148 |
| 11,342,610 | B2 * | 5/2022 | Geskes | B60L 50/64 |
| 2018/0026243 | A1 * | 1/2018 | Stojanovic | B60L 58/21 429/99 |
| 2019/0088912 | A1 * | 3/2019 | Goh | H01M 10/425 |
| 2022/0141949 | A1 * | 5/2022 | Devalla | H01R 12/52 361/721 |
| 2022/0320602 | A1 * | 10/2022 | Lin | H01M 10/425 |

FOREIGN PATENT DOCUMENTS

| | | | | |
|---|---|---|---|---|
| CA | 2965569 C | * | 5/2019 | H05B 45/35 |
| CN | 110459888 A | * | 11/2019 | H01M 10/486 |
| TW | I765603 B | * | 5/2022 | H01R 13/6315 |

OTHER PUBLICATIONS

Machine translation of Li et al (TW 1765603 B) (Year: 2022).*

* cited by examiner

*Primary Examiner* — Allen L Parker
*Assistant Examiner* — Elisa Sasserath

(57) ABSTRACT

To reduce the height of a connector having a retainer in which a positioning post is formed. A cable terminal, having an inclined part which is formed between a front upper plate part and a rear upper plate part and which is inclined to approach a center line toward the rear side. The retainer has the positioning post that is positioned to the rear of the inclined part and restricts movement of the cable terminal in the rearward direction of the cable terminal.

7 Claims, 7 Drawing Sheets

BATTERY CONNECTION MODULE

RELATED APPLICATIONS

This application claims priority to Chinese Utility Application No. 202222437176.6, which was filed Sep. 14, 2022; the contents therein are incorporated by reference in its entirety.

TECHNICAL FIELD

The present disclosure relates to technical field of batteries, and specifically relates to a battery connection module.

BACKGROUND

A battery pack acts as a power source of an electrical vehicle, it is quite important to monitor various properties of the battery pack. A battery connection module basically includes a circuit board, busbars which connects batteries and connecting members which are connected between the circuit board and the busbars. What is difficult is, in assembling, a large relative movement between the busbar and the circuit board will be generated when the busbar is welded to the corresponding battery. In a working state, each component of the battery connection module and each battery of a battery unit will also move relative to each other. In addition to expansion caused by chemical reaction of the battery unit, under alternating circumstance temperatures, temperature difference between batteries of the battery unit will also cause such a movement. Additionally, a certain impact force subjected in a vibrating process will also generate such a movement, in turn signal collection of the battery connection module is not stable, working life of the battery connection module becomes shortened. Therefore, the connecting member between the circuit board and the corresponding busbar needs to be capable of assuring to compensate the statically subjected force and the dynamic movement, so as to make that the battery connection module can stably collect a signal and has longer working life.

Chinese patent document CN110459888A discloses an electrical conductive terminal which includes a fixing portion, a contacting portion which is electrically connected with a corresponding battery and a connecting arm which connects the fixing portion and the contacting portion, the connecting arm has a flat plate portion and a folding portion, the folding portion is curvedly provided so as to be elastically connected between a base portion and the contacting portion. The fixing portion of the electrical conduction terminal has the base portion which is electrically connected with a circuit board and a fixing leg and a soldering portion which bend from the base portion and extend.

However, the folding portion is a part which is folded along a board surface direction, may be used to compensate movement in an up-down direction and movement in a front-rear direction, but apparently, compensation capability for movement in a left-right direction is weaker, compensation of the above construction for relative movement between the two components and expansion is not sufficient yet.

Additionally, with respect to the existing connecting member connected between a circuit board and a busbar, because a balance current trace and a voltage detection trace share one trace, the balance current will result in larger voltage drop of two ends of the connecting member, which results in lower precision of voltage detection.

SUMMARY

An object of the present disclosure is to provide a battery connection module which can improve at least one deficiency in prior art.

A battery connection module of an embodiment of the present disclosure is adapted to connect a plurality of batteries, the battery connection module comprises a plurality of busbars which are electrically conductive, a circuit board and a plurality of bridging members which are electrically conductive. The plurality of busbars are used to be connected to the plurality of the batteries; each bridging member is connected between the corresponding the busbar and the circuit board; each bridging member has one busbar connecting portion, two circuit board connecting portions which are separated from each other and two buffering arms which are separated from each other; the busbar connecting portion of each bridging member is connected to the corresponding busbar, first ends of the two buffering arms are connected to the one busbar connecting portion and second ends of the two buffering arms are respectively connected with the two circuit board connecting portions, the two circuit board connecting portions of each bridging member are separately connected to two different traces of the circuit board.

According to some embodiments of the present disclosure, the two different traces of the circuit board comprise a balance current trace and a voltage detection trace.

According to some embodiments of the present disclosure, the two buffering arms are in the same plane and constitute a symmetric shape, each buffering arm has at least one curving portion.

According to some embodiments of the present disclosure, each buffering arm has two first curving portions which are positioned in a first direction and one second curving portion which is positioned in a second direction.

According to some embodiments of the present disclosure, there are steps between a plane where the buffering arm is presented and the busbar connecting portion and the circuit board connecting portion, the first end of each buffering arm is connected to the busbar connecting portion via a first step connecting portion, and the second end of each buffering arm is connected to the circuit board connecting portion via a second step connecting portion.

According to some embodiments of the present disclosure, a distance between the two first step connecting portions of the bridging member is less than a distance between the two second step connecting portions of the bridging member.

According to some embodiments of the present disclosure, the circuit board connecting portion is provided with through holes for soldering.

One embodiment of the present disclosure at least has the following advantages or beneficial effects: in the battery connection module of the embodiment of the present disclosure, the bridging member has the two buffering arms which are separated from each other and the two circuit board connecting portions which are separated from each other, the two circuit board connecting portions are used to be separately connected to two different traces of the circuit board, the two different traces for example are the balance current trace and the voltage detection trace, so that the balance current will not affect precision of voltage detection. Additionally, the buffering arm of the bridging member has higher deformation capability and better anti-vibrating effect, compensation capability of the bridging member for relative movement between the circuit board and the corresponding busbar and expansion of the corresponding battery can be enhanced.

DETAILED DESCRIPTION

Figure 1:
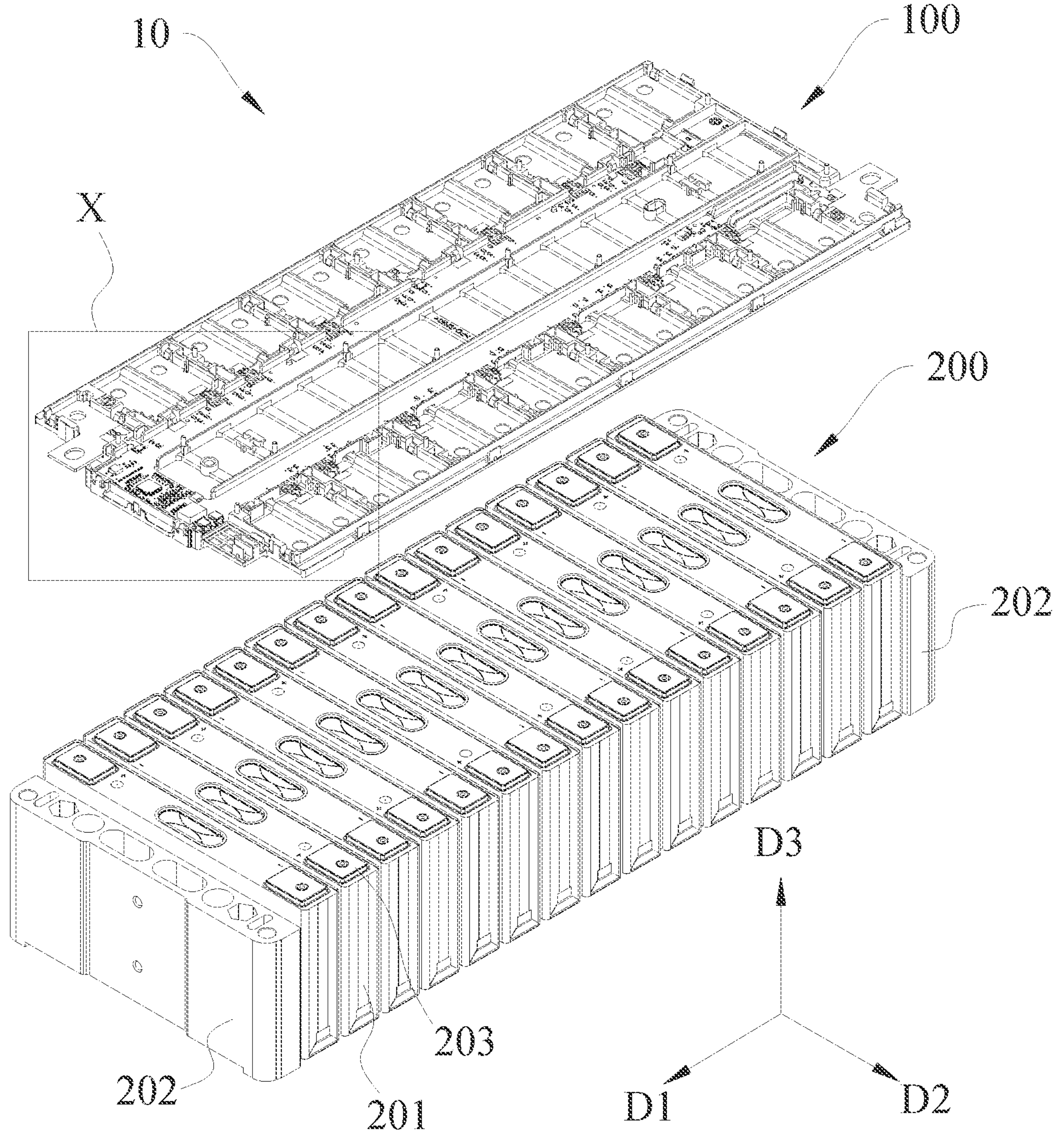
FIG. 1 illustrates an exploded schematic view of a battery pack of an embodiment of the present disclosure.

Exemplary embodiments will now be described more fully with reference to the accompanying drawings. However, the exemplary embodiments may be implemented in many forms and the present disclosure should not be construed to be limited to the embodiments set forth herein; instead, these embodiments are provided so that the present disclosure will be full and complete, and the concepts of the exemplary embodiments will be fully conveyed to the person skilled in the art. The same reference numerals indicate the same or similar structure in the drawings, and the repeated description thereof will be omitted.

As shown in FIG. 1, FIG. 1 illustrates an exploded schematic view of a battery pack 10 of an embodiment of the present disclosure. The battery pack 10 includes a battery connection module 100 and a battery group 200. The battery connection module 100 may be provided above the battery group 200. The battery group 200 includes a plurality of batteries 201 and end plates 202. The plurality of batteries 201 are arranged as one row, and two ends of the plurality of batteries 201 of the one row are respectively provided with the end plates 202.

The battery connection module 100 is used to connect the plurality of batteries 201 of the battery group 200, and is used to detect voltages, temperatures or other battery parameters of the plurality of batteries 201.

It may be understood that the plurality of batteries 201 may be connected in parallel or in series by means of the battery connection module 100.

It should be noted that the terms “include” and “has/have” and any variations thereof in the embodiment of the present disclosure are intended to cover non-exclusive inclusion. For example, a process, method, system, product, or device that includes a series of steps or units is not limited to the listed steps or units, but optionally further includes a step or unit which is not listed, or optionally further includes other steps or components that are inherent to these processes, methods, products, or devices.

Figure 2:
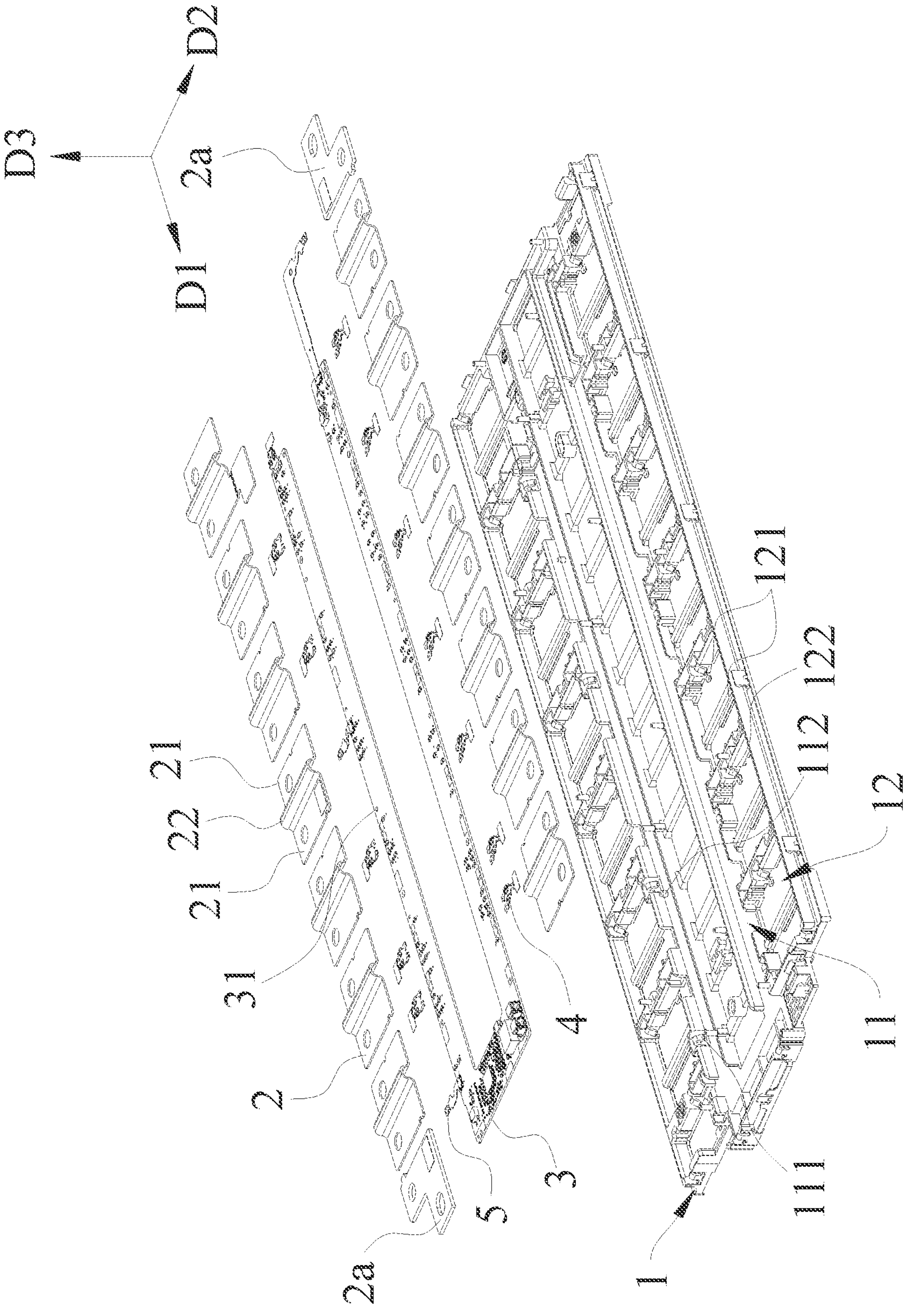
FIG. 2 illustrates an exploded schematic view of a battery connection module of the embodiment of the present disclosure.
Figure 3:
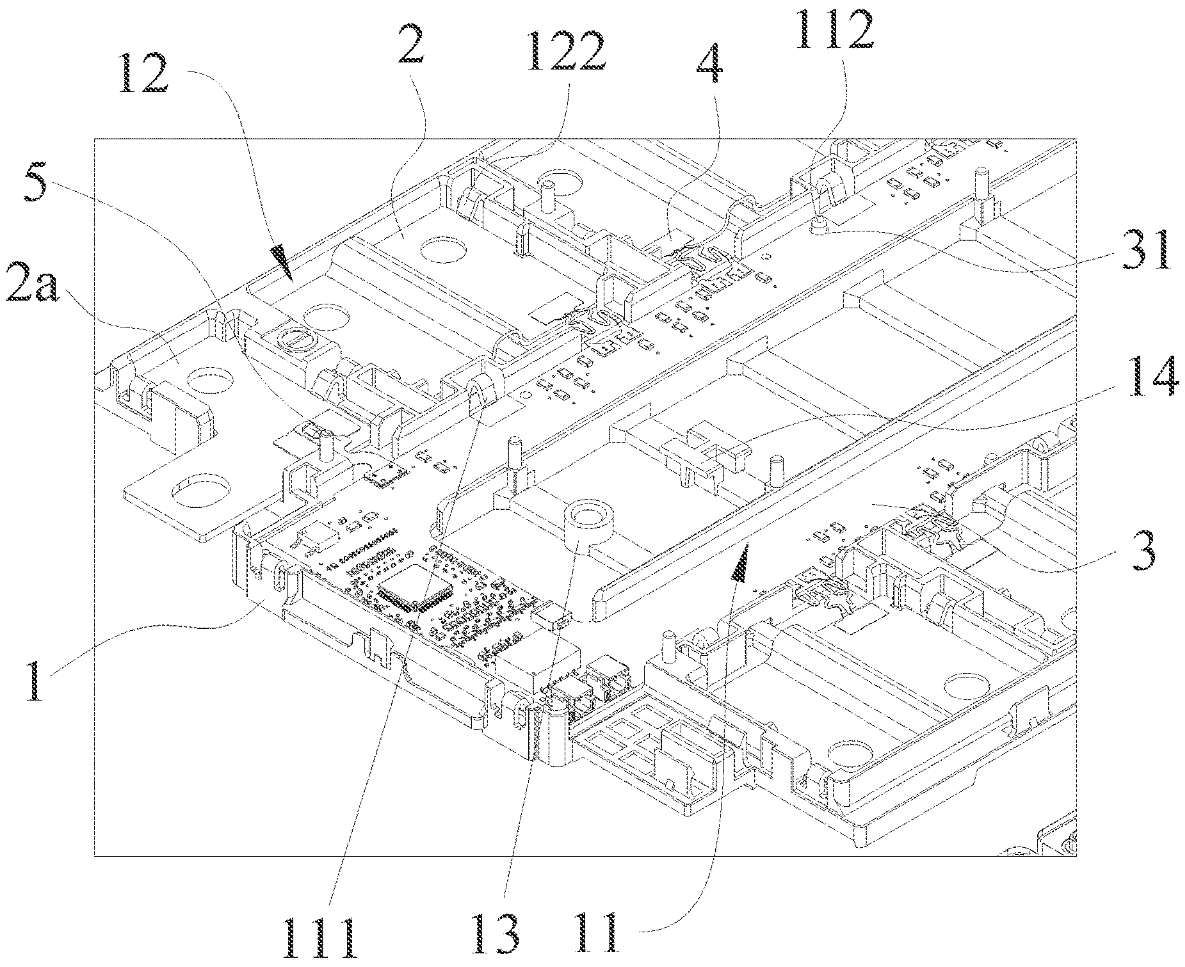
FIG. 3 illustrates a partially enlarged view of FIG. 1 indicated by a frame X.
Figure 4:
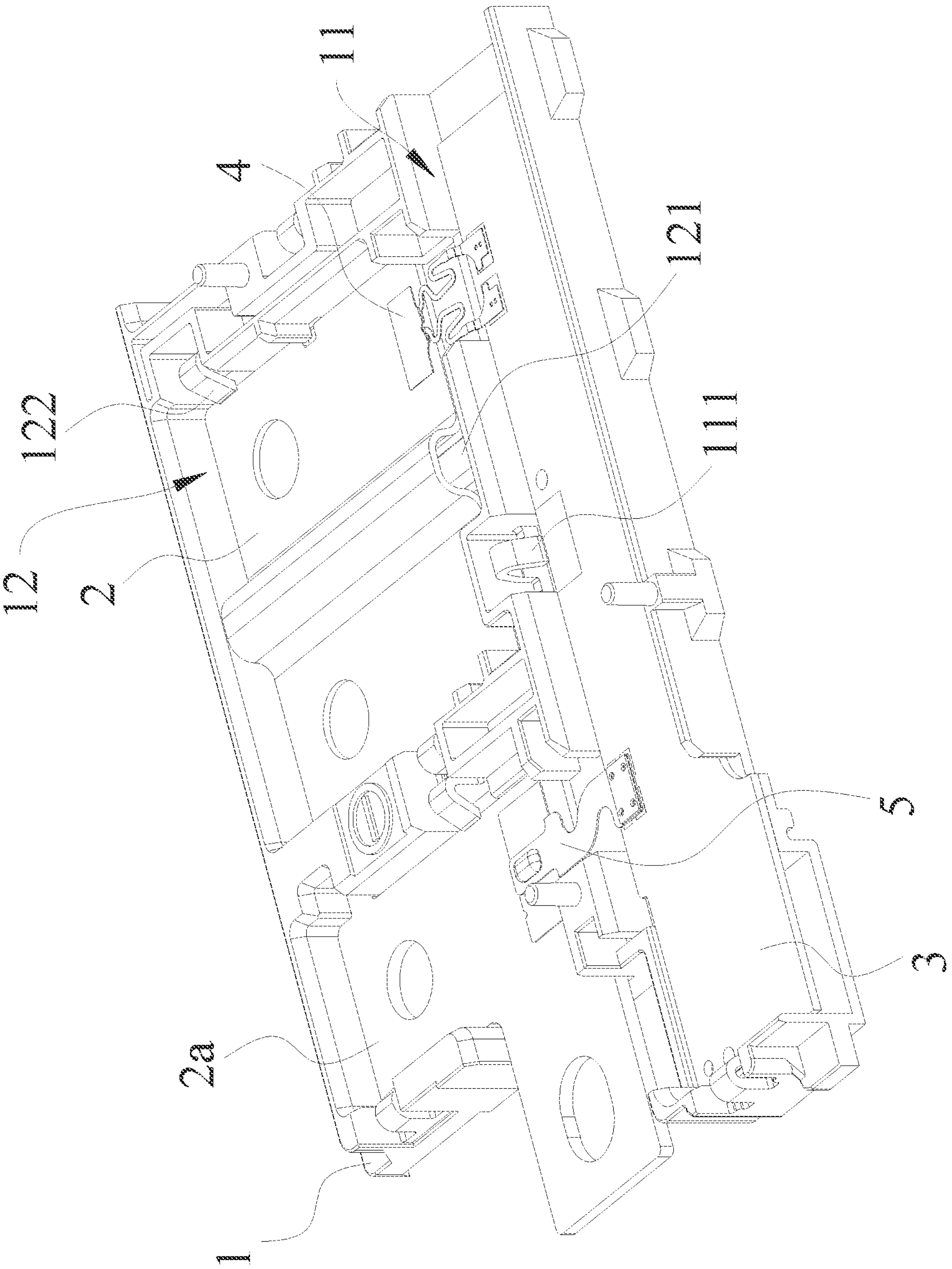
FIG. 4 illustrates a partial schematic view of one corner of the battery connection module of the embodiment of the present disclosure.

As shown in FIG. 2, FIG. 2 illustrates an exploded schematic view of the battery connection module 100 of the embodiment of the present disclosure. FIG. 3 illustrates a partially enlarged view of FIG. 1 indicated by a frame X. FIG. 4 illustrates a partial schematic view of one corner of the battery connection module 100 of the embodiment of the present disclosure. The battery connection module 100 includes a tray 1, a plurality of busbars 2 which are electrically conductive, a circuit board 3, a plurality of bridging members 4 which are electrically conductive and temperature sensing assemblies 5.

As an example, the tray 1 may be integrally formed by an insulative material, is a rectangular structure which extends along a front-rear direction D1 (a direction to which an arrow points is front, and an opposite direction is rear) and a left-right direction D2 (a direction to which an arrow points is left, and an opposite direction is right), and is provided above the battery group 200 along an up-down direction D3 (a direction to which an arrow points is up, an opposite direction is down). Here, the front-rear direction D1, the left-right direction D2 and the up-down direction D3 are perpendicular to each other.

The tray 1 includes a circuit board assembling portion 11 and a plurality of busbar assembling grooves 12, the circuit board assembling portion 11 is positioned in a middle region of the tray 1 and extends along the front-rear direction D1, the plurality of busbar assembling grooves 12 are positioned at two opposite sides of the circuit board assembling portion 11 in the left-right direction D2 and are arranged in the front-rear direction D1.

The circuit board assembling portion 11 is provided with a first elastic latching member 111, the first elastic latching member 111 is used to latch the circuit board 3 so as to avoid the circuit board 3 detaching from the tray 1 after the circuit board 3 is assembled to the circuit board assembling portion 11.

Figure 5:
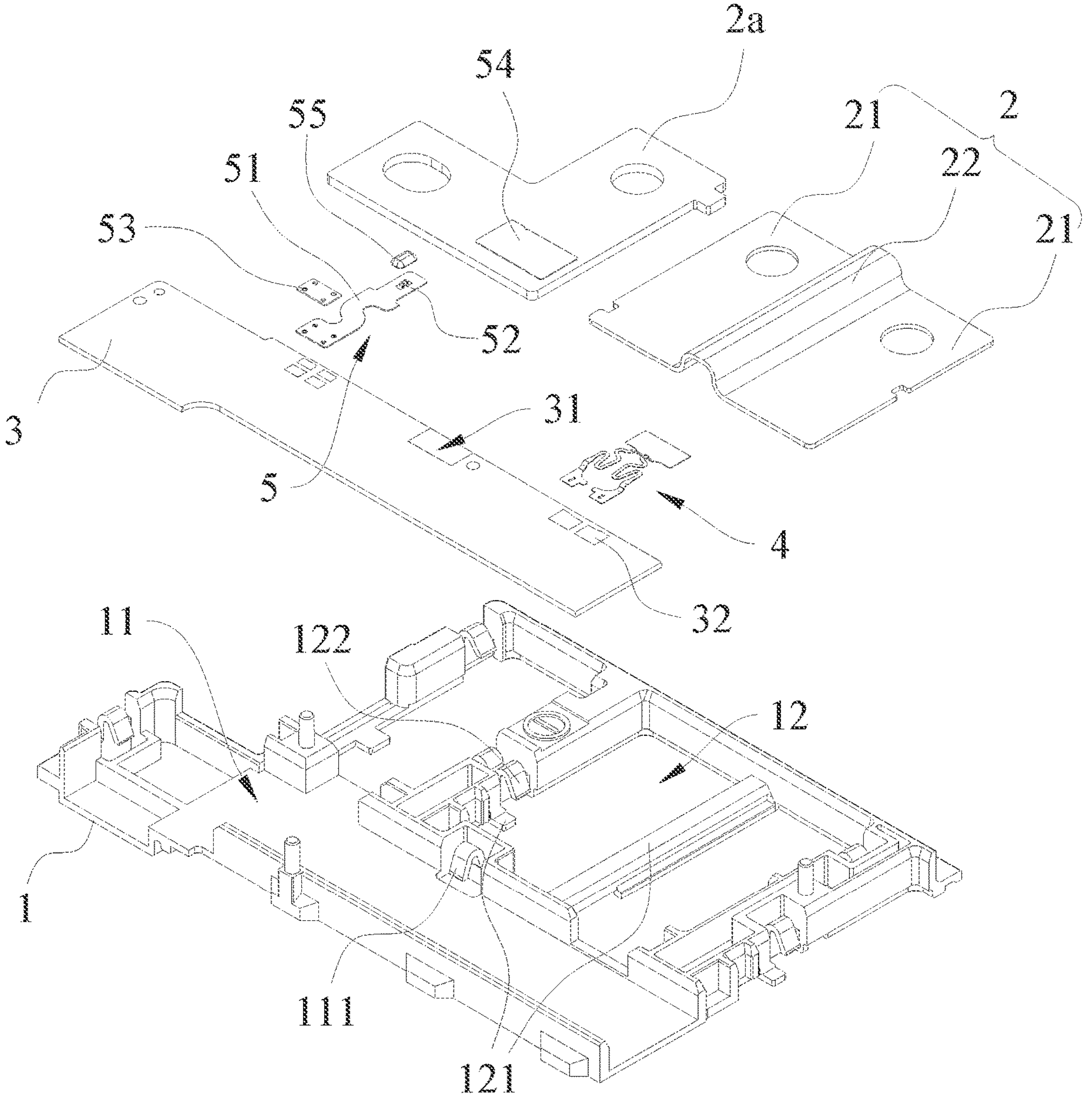
FIG. 5 illustrates an exploded schematic view of FIG. 4.

The circuit board assembling portion 11 is further provided with an assembling post 112 which is used to cooperate with an assembling hole 31 of the circuit board 3 (see FIG. 5). The assembling post 112 may pass through the assembling hole 31, and furthermore, the assembling post 112 may form an enlarged head portion by hot melting.

Each busbar assembling groove 12 is provided with a supporting member 121 and a second elastic latching member 122. The supporting member 121 is used to support the corresponding busbar 2 from below, and the second elastic latching member 122 is used to latch the corresponding busbar 2 from above.

It is noted that, by action of the supporting member 121 and the second elastic latching member 122, the busbar 2 is limited in the corresponding busbar assembling groove 12, the busbar 2 is not fixed relative to the corresponding busbar assembling groove 12, but the busbar 2 is movably assembled in the corresponding busbar assembling groove 12, so that when the busbar 2 is welded with a corresponding electrode 203 of the battery 201 of the battery group 200, the busbar 2 is capable of moving relative to the corresponding busbar assembling groove 12.

Continuously referring to FIG. 2 to FIG. 4, the plurality of busbars 2 are assembled in the plurality of busbar assembling grooves 12 by one-to-one correspondence, and are mechanically and electrically connected with the electrode(s) 203 of the corresponding batteries (battery) 201 by welding (for example ultrasonic welding) respectively. And by that the plurality of busbars 2 are staggeringly provided, the plurality of batteries 201 from beginning to end therebetween constitutes a power circuit in in series or in parallel.

Each busbar 2 may be made of an electrically conductive metal, and is formed by integrally bending. The electrically conductive metal may include aluminum, cooper and the like or combination thereof. Certainly, the busbar 2 also may be formed by laminating layers of the above different metals.

The plurality of busbars 2 are divided into two groups, and the two groups of busbars 2 are respectively assembled to two sides of the circuit board assembling portion 11 of the tray 1 in the left-right direction D2. Each group of busbars 2 is arranged along the front-rear direction D1. The busbar 2 at an end portion of each group of busbars 2 is an outputting busbar 2*a*, the two outputting busbars 2*a* may respectively act as a positive pole and a negative pole of the battery pack 10, and are used to be connected with a positive pole and a negative pole of an external load.

In the present embodiment, the two outputting busbar 2*a* are respectively positioned at two ends of the battery connection module 100 in the front-rear direction D1.

Except the two outputting busbars 2*a* of the plurality of busbars 2, each of the other busbars 2 of the plurality of busbars 2 includes two battery connecting portions 21 and a bulging portion 22 which is provided between the two battery connecting portions 21 and is used as buffering function. The battery connecting portion 21 may be connected with the corresponding electrode 203 of the corresponding battery 201 by welding.

Continuously referring to FIG. 2 to FIG. 4, the temperature sensing assembly 5 includes a flexible circuit board 51, a temperature sensor 52, a strengthening plate 53, a conducting plate 54 and a packaging cover 55.

A first end of the flexible circuit board 51 is connected with the circuit board 3. Specifically, the first end of the flexible circuit board 51 is connected to the circuit board 3 via the strengthening plate 53 to promote firmness of connection. A second end of the flexible circuit board 51 is connected with the corresponding busbar 2. The conducting plate 54 is provided between the second end of the flexible circuit board 51 and the corresponding busbar 2, and is used to account for both functions of thermal conduction and electrical conduction. The temperature sensor 52 is provided to the second end of the flexible circuit board 51, because the second end of the flexible circuit board 51 is connected with the corresponding busbar 2, the temperature sensor 52 can more rapidly collect temperature to shorten responding time. The packaging cover 55 is packaged to the temperature sensor 52. As an example, the packaging cover 55 may be an insulative block, a thermal conductive adhesive and the like.

Certainly, the flexible circuit board 51 may have a voltage collecting circuit and a temperature collecting circuit at the same time.

As an example, the temperature sensor 52 may a negative temperature coefficient thermistor (NTC), but the present disclosure is not limited thereto.

As shown in FIG. 5, FIG. 5 illustrates an exploded schematic view of FIG. 4. The circuit board 3 may be a rigid printed circuit board, which is more beneficial to lower cost.

The circuit board 3 is opened with the assembling hole 31, the assembling hole 31 is used to allow the assembling post 112 of the tray 1 to pass therethrough, and is used to position the circuit board 3 when the circuit board 3 is assembled to the circuit board assembling portion 11.

The tray 1 is further provided thereon with a positioning construction 13 and a grasping construction 14. In an automatic production line, a grasping device needs to move the battery connection module 100. The positioning construction 13 is used to make the grasping device positioned to a preset position of the tray 1, so that the grasping device can accurately grasp the grasping construction 14 of the tray 1.

As an example, the positioning construction 13 may include a positioning hole, the grasping device includes a positioning post. When the grasping device moves to the preset position of the tray 1, the positioning post inserts into the positioning hole.

Figure 6:
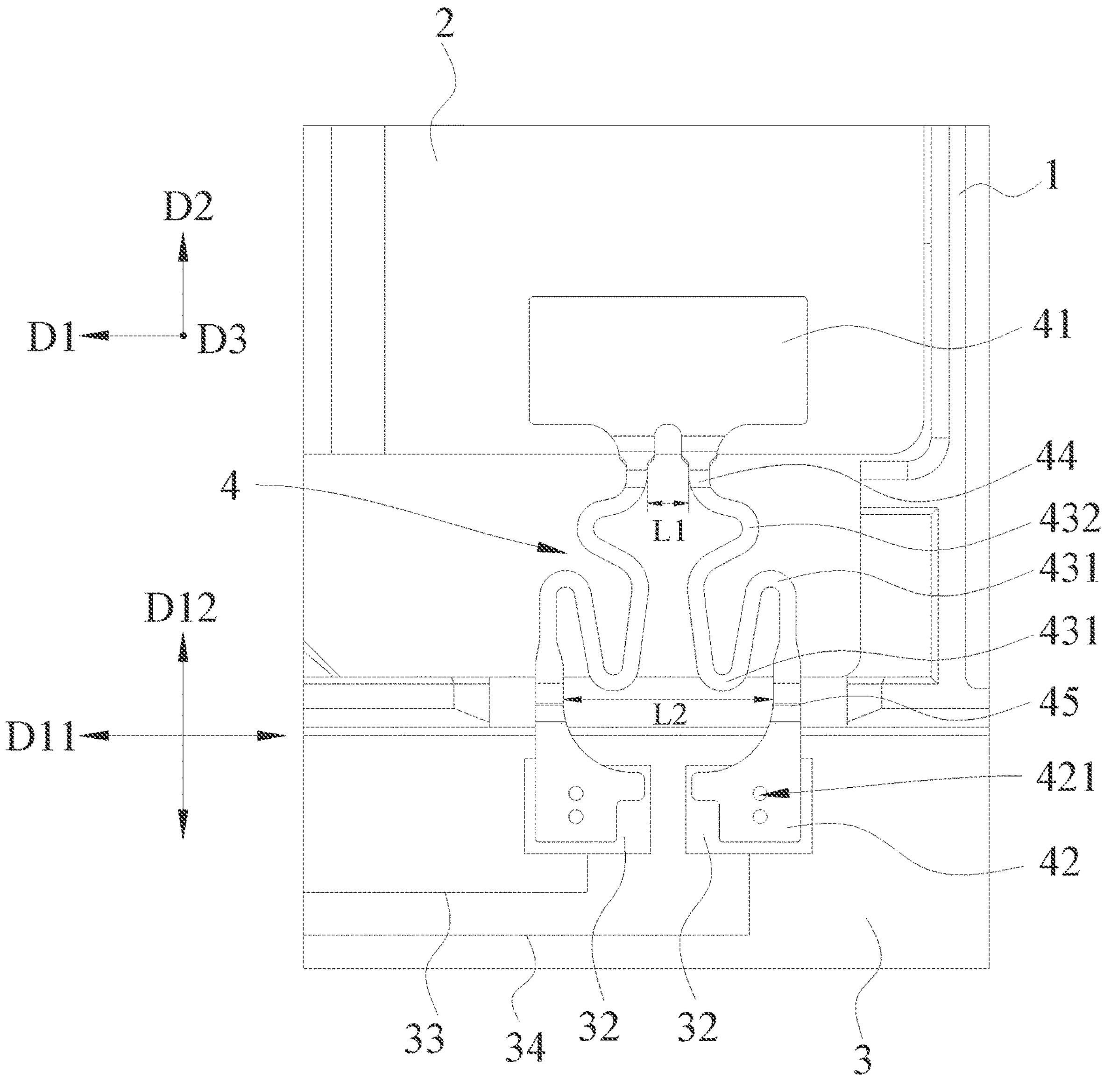
FIG. 6 illustrates a top schematic view that a bridging member is connected to a busbar and a circuit board in the embodiment of the present disclosure.
Figure 7:
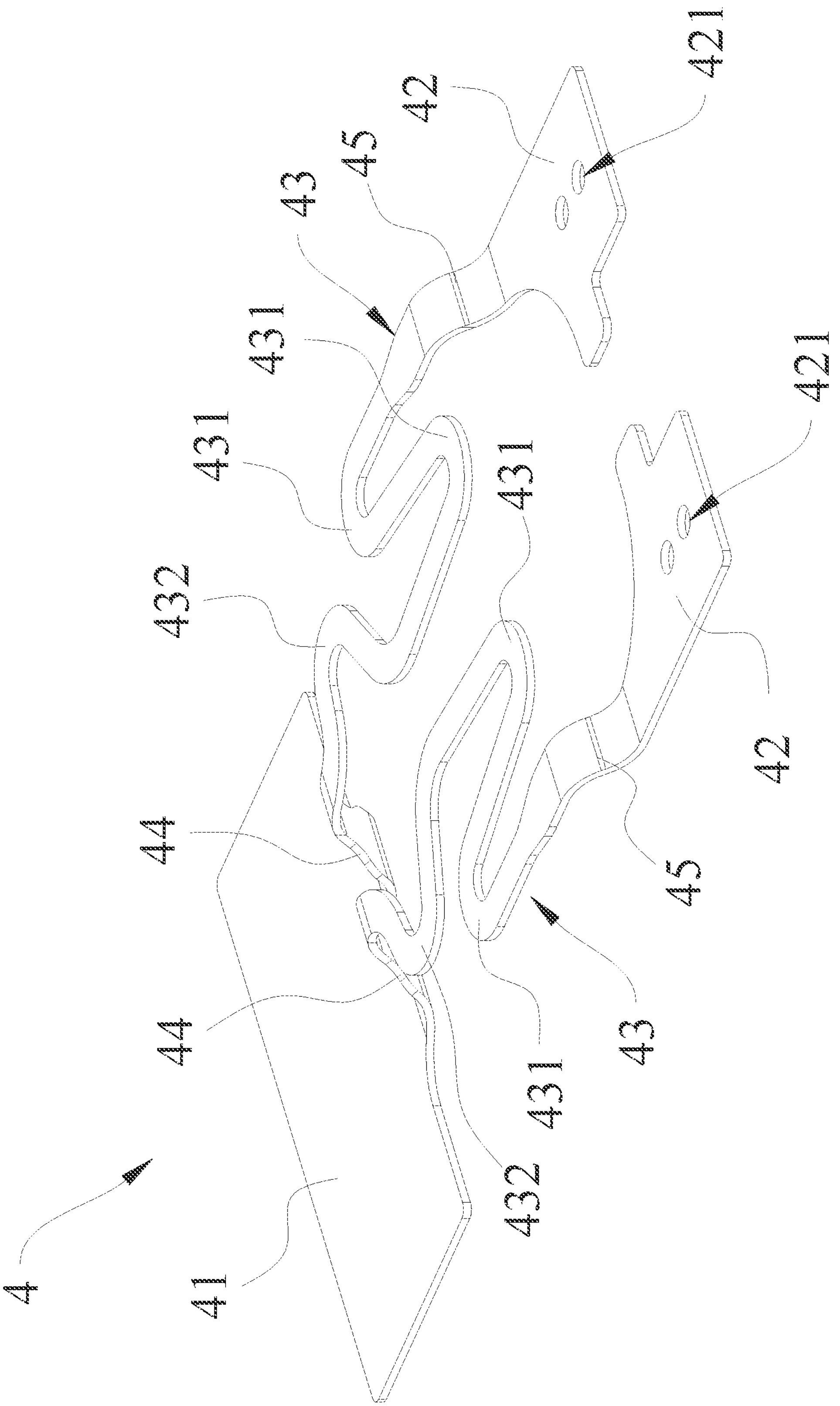
FIG. 7 illustrates a structural schematic view of the bridging member of the embodiment of the present disclosure.

As shown in FIG. 6 and FIG. 7, FIG. 6 illustrates a top schematic view that the bridging member 4 is connected to the corresponding busbar 2 and the circuit board 3 in the embodiment of the present disclosure. FIG. 7 illustrates a structural schematic view of the bridging member 4 of the embodiment of the present disclosure. The bridging member 4 may be made of an electrical conductive metal, and is formed by stamping and bending a metal sheet. Each bridging member 4 is connected between the corresponding busbar 2 and the circuit board 3. Each bridging member 4 has one busbar connecting portion 41, two circuit board connecting portions 42 which are separated from each other and two buffering arms 43 which are separated from each other. The busbar connecting portion 41 of each bridging member 4 is connected to the corresponding busbar 2, first ends of the two buffering arms 43 are connected to the same busbar connecting portion 41 and second ends of the two buffering arms 43 are respectively connected the two circuit board connecting portions 42, the two circuit board connecting portions 42 of each bridging member 4 are separately connected to two different traces of the circuit board 3.

In the present embodiment, the bridging member 4 has the two buffering arms 43 which are separated from each other and the two circuit board connecting portions 42 which are separated from each other, the two circuit board connecting portions 42 are used to be separately connected to the two different traces of the circuit board 3, the two different traces for example are a balance current trace 33 and a voltage detection trace 34, so that the balance current does not affect precision of voltage detection. Additionally, the buffering arm 43 of the bridging member 4 has higher deformation capability to enhance compensating capability of the bridging member 4 for relative movement between the circuit board 3 and the corresponding busbar 2 of and expansion of the corresponding battery 201.

The two different traces of the circuit board 3 includes the balance current trace 33 and the voltage detection trace 34. Because the bridging member 4 has the two buffering arms 43 which are separated from each other and the two circuit board connecting portions 42 which are separated from each other, the balance current will not affect precision of voltage detection.

The circuit board 3 is provided with two soldering pads 32, one soldering pad 32 of the two soldering pads 32 is electrically connected with the balance current trace 33, and the other soldering pad 32 of the two soldering pads 32 is electrically connected with the voltage detection trace 34. The two circuit board connecting portions 42 of the bridging member 4 which are separated from each other are respectively soldered with the two soldering pads 32.

The circuit board connecting portion 42 is further provided with through holes 421 for soldering. By means of the through holes 421, the circuit board connecting portion 42 is soldered with the soldering pad 32. Provision of the through holes 421 can strengthen soldering holding force after the circuit board connecting portion 42 and the soldering pad 32 are soldered.

The two buffering arms 43 are in the same plane and constitute a symmetric shape. Each buffering arm 43 has at least one curving portion 431,432. By the design that the buffering arm 43 has at least one curving portion 431,432, deformation capability of the buffering arm 43 is higher, and anti-vibrating effect is better.

In the present embodiment, each buffering arm 43 has two first curving portions 431 which are positioned in a first direction D11 and one second curving portion 432 which is positioned in a second direction D12. The two first curving portions 431 continuously curve in the first direction D11. By the two first curving portions 431 and the one second curving portion 432, relative movement between the circuit board connecting portion 42 and the busbar connecting portion 41 along the first direction D11, the second direction D12 and the up-down direction D3 can be compensated. The first direction D11 and the second direction D12 may be perpendicular to each other.

There are steps between a plane where the buffering arm 43 is presented and the busbar connecting portion 41 and the circuit board connecting portion 42, the first end of each buffering arm 43 is connected to the busbar connecting portion 41 via a first step connecting portion 44 and the second end of each buffering arm 43 is connected to the circuit board connecting portion 42 via a second step connecting portion 45.

By the first step connecting portion 44 and the second step connecting portion 45, there may be a step between the buffering arm 43 and the busbar connecting portion 41 and there may be a step between the buffering arm 43 and the circuit board connecting portion 42, which in turn compensation for relative movement between the circuit board connecting portion 42 and the busbar connecting portion 41 along the up-down direction D3 and a space between the circuit board connecting portion 42 and the busbar connecting portion 41 along the up-down direction D3 can be increased.

It may be understood that, the plane where the buffering arm 43 is presented may be higher than a plane where the circuit board connecting portion 42 is presented, also may be lower than the plane where the circuit board connecting portion 42 is presented. The plane where the buffering arm 43 is presented may be higher than a plane where the busbar connecting portion 41 is presented, also may be lower than the plane where the busbar connecting portion 41 is presented.

Continuously referring to FIG. 6 and FIG. 7, the two first step connecting portions 44 therebetween have a first distance L1, the two second step connecting portions 45 therebetween have a second distance L2, the first distance L1 is less than the second distance L2.

In conclusion, advantages and beneficial effects of the battery connection module 100 of the embodiment of the present disclosure lie in that: in the battery connection module 100 of the embodiment of the present disclosure, the balance current trace 33 and the voltage detection trace 34 of the circuit board 3 are separated from each other, the bridging member 4 has the two buffering arms 43 which are separated from each other and the two circuit board connecting portions 42 which are separated from each other, the two buffering arms 43 and the two circuit board connecting portions 42 are used to be separately connected to the balance current trace 33 and the voltage detection trace 34 of the circuit board 3 which are separated from each other, so that the balance current will not affect precision of voltage detection. Additionally, the battery connection module 100 of the embodiment of the present disclosure further provides a bridging member 4 which has higher deformation capability and better anti-vibrating effect, compensation capability of the bridging member 4 for relative movement between the circuit board 3 and the corresponding busbar 2 and expansion of the corresponding battery 201 can be enhanced.

It can be understood that the various embodiments/implementing manners provided by the present disclosure can be combined with each other without confliction, and these combinations are not described one-by one herein.

In the embodiment of the present disclosure, the terms "first", "second" and "third" are only used for purpose of description and cannot be construed as indicating or implying relative importance; and the term "a plurality of" refers to "two or more", unless expressly defined otherwise. The terms "mount", "connect with", "connect", "fix" and the like should be broadly understood, for example, the "connect" may be fixedly connect, detachably connect or integrally connect, "connect with" may be directly connect with or indirectly connect with via an intermediate medium. The skilled in the art may understand specific meaning of these terms in the embodiment of the present disclosure according to the specific situations.

In the description of the embodiment of the present disclosure, it is to be understood that, the orientation or position relationship indicated by the terms such as "up", "down", "left", "right", "front", "rear" and the like is based on the orientation or position relation indicated by the drawings, only serves to facilitate describing the present disclosure and simplifying the description, rather than indicating or implying that the referred device or unit must have the particular orientation, constructed and operate in the particular orientation, so cannot be construed as limiting the embodiment of the present disclosure.

In the description of the present specification, the description of the terms "one embodiment", "some embodiments", "specific embodiments" and the like refers to that a specific feature, structure, material or characteristic described in combination with the embodiment or example is included in at least one embodiment or example of the embodiments of the present disclosure. In the present specification, the illustrative expression of the above terms does not necessarily refer to the same embodiment or example. Furthermore, the specific features, structures, materials or characteristics described may be combined in a suitable manner in any one or more embodiments or examples.

The above descriptions are only preferred embodiment of the present disclosure and are not intended to limit the embodiment of the present disclosure. For the person skilled in the art, various modifications and changes may be made to the embodiment of the present disclosure. Any modifications, equivalent replacements, improvements and the like made within the spirit and principle of the embodiment of the present disclosure shall be included within the protective scope of the embodiment of the present disclosure.

What is claimed is:

1. A battery connection module for connecting a plurality of batteries, the battery connection module comprising:

a plurality of busbars which are electrically conductive and are configured to be connected to the plurality of batteries;

a circuit board having a plurality of first electrical traces thereon and a plurality of second electrical traces thereon which are separated from each other; and a plurality of bridging members which are electrically conductive, each bridging member having a busbar connecting portion coupled to a respective one of the busbars, a first buffering arm coupled to the busbar connecting portion, a second buffering arm coupled to the busbar connecting portion, the first and second buffering arms being separated from each other, a first circuit board connecting portion coupled to the first buffering arm and coupled to one of the first electrical traces of the circuit board, and a second circuit board connecting portion coupled to the second buffering arm and coupled to one of the second electrical traces of the circuit board, the first and second circuit board connecting portions being separated from each other.

2. The battery connection module according to claim 1, wherein the first electrical traces of the circuit board comprise balance current traces and the second electrical traces comprise voltage detection traces.

3. The battery connection module according to claim 1, wherein the first and second buffering arms are in the same plane and are symmetrical, each buffering arm having at least one curving portion.

4. The battery connection module according to claim 3, wherein each buffering arm has two first curving portions which are positioned in a first direction and one second curving portion which is positioned in a second direction.

5. The battery connection module according to claim 1, wherein each bridging member further comprises a first step connecting portion forming a step between a plane in which the first buffering arm is provided and a plane in which the busbar connecting portion is provided, a second step connecting portion forming a step between a plane in which the second buffering arm is provided and the plane in which the busbar connecting portion is provided, a third step connecting portion forming a step between the plane in which the first buffering arm is provided and a plane in which the first circuit board connecting portion is provided, and a fourth step connecting portion forming a step between the plane in which the second buffering arm is provided and a plane in which the second circuit board connecting portion is provided.

6. The battery connection module according to claim 5, wherein in each bridging member a distance between the first and second step connecting portions is less than a distance between the third and fourth step connecting portions.

7. The battery connection module according to claim 1, further comprising through holes in the first and second circuit board connecting portions for soldering the first and second circuit board connecting portions to the circuit board.

* * * * *